June 9, 1936.  F. KOENIG  2,043,546
APPARATUS TO FACILITATE INSERTION OF ARMATURES WITHIN CASINGS
Filed March 21, 1934
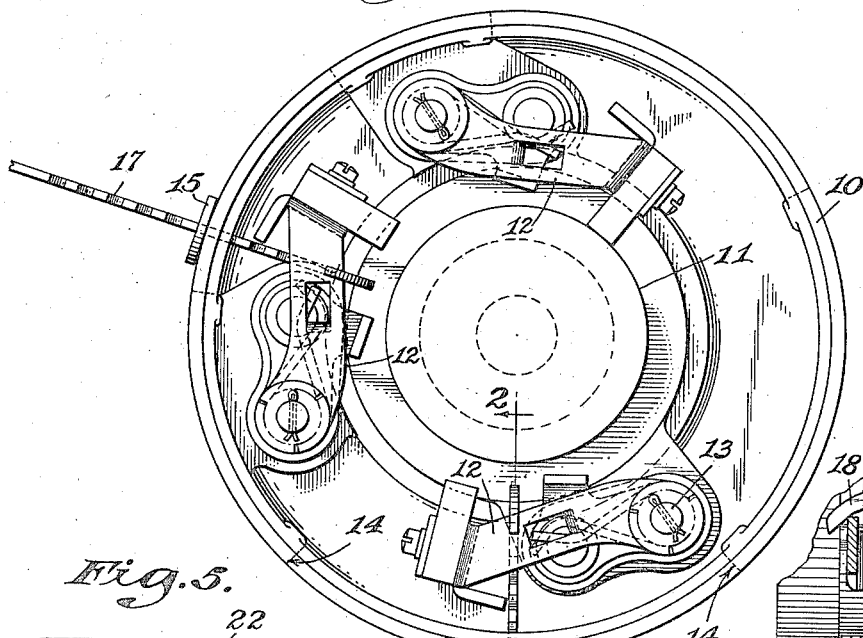
Fig. 1.
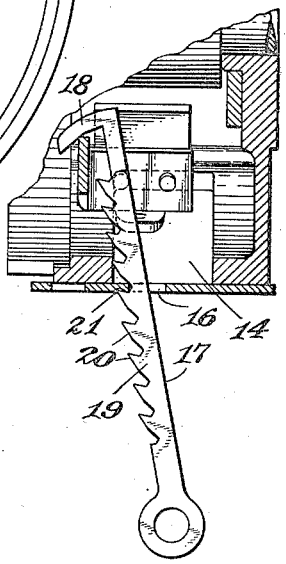
Fig. 2.
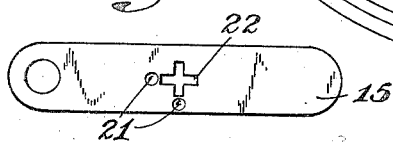
Fig. 5.
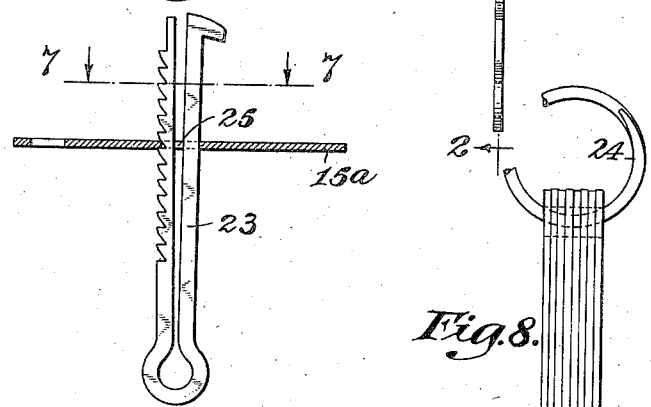
Fig. 6.
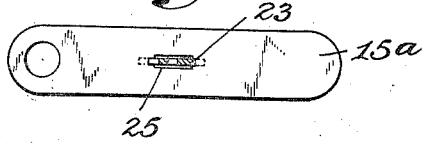
Fig. 7.
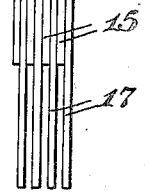
Fig. 8.
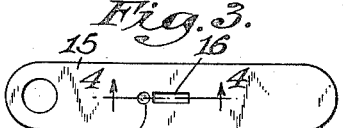
Fig. 3.
Fig. 4.
Fred Koenig
INVENTOR Patented June 9, 1936

2,043,546

UNITED STATES PATENT OFFICE 2,043,546

APPARATUS TO FACILITATE INSERTION OF ARMATURES WITHIN CASINGS

Fred Koenig, Tottenville, N. Y.

Application March 21, 1934, Serial No. 716,603

3 Claims. (Cl. 81—3)

This invention relates to a method and apparatus for facilitating the insertion of an armature and commutator within the stator of a dynamo electric machine having the commutator end of the machine casing closed, and has for its object to increase the ease of insertion of said armature and at the same time provide a tool for accomplishing this purpose with fewer workmen and in a shorter time.

In dynamo electric machines such as are used for example on automobiles, it has been difficult to insert the armature and commutator into the casing because the closed end of the casing usually contains brushes which under the pressure of their springs get in the way of the commutator unless several workmen are used to assist in holding each of the brushes retracted.

According to the present invention the time required for the insertion of the armature is substantially lessened, and the necessity of more than one workman is eliminated.

Fig. 1 shows one embodiment of this invention for holding the brushes retracted.

Fig. 2 is a side view of one of the supporting hook members extending through the casing in Fig. 1, the same being a section on the line 2—2 of Fig. 1.

Figs. 3 and 4 illustrate one of the hook member supporting plates.

Fig. 5 is a modified form of hook member supporting plate.

Fig. 6 shows another form of hook member.

Fig. 7 shows one of the supporting plates for a hook member of the type shown in Fig. 6, and is a section on the line 7—7 of Fig. 6.

Fig. 8 shows a set of plates and hook members assembled on a ring 24 for convenience in carrying.

In the usual dynamo electric machine found in automobiles and elsewhere, the casing 10 encloses the commutator 11 and the brushes and holders illustrated. The dotted lines indicate the presence of peripheral slots radially outside of the brush holders 12 and these slots may or may not be normally closed in some convenient manner according to the purpose for which the machine is used. Each brush holder 12 is pivoted at 13 and adapted to be retracted against the force of the brush spring by movement around the brush holder pivot. Transversely spanning peripheral slot 14 over each brush holder is a plate 15 for temporarily supporting a hook member 17 extending through a slot 16 in said plate. The members 17 have one end portion 18 provided with a hook adapted to engage the brush holder supporting arm for maintaining the same retracted from operative position. The stem 19 of each hook member 17 is provided with teeth 20, inclined and of the general shape indicated. The member 17 is held by means of one of the teeth 20 engaging an edge of the slot 16 in the plate 15 as illustrated in Fig. 2, this Fig. 2 being a section on the line 2—2 of Fig. 1. To assist in maintaining the hook member 17 in position there is provided a recess 21 as shown in Figs. 2 and 3 so located as to enable one of the teeth 20 to be received and held therein without danger of the hook member 17 being moved accidentally out of place.

In operation a plate member 15 is placed in position across one of the openings 14, and the hook member 17 being inserted through the slot 16 is directed under one of the brush supporting holders 12. The hook member 17 can then be moved radially outward enough to withdraw the brush holder well away from the commutator and the brush holder can then be held in that position illustrated in Fig. 2 with a tooth 20 in a recess 21.

In a similar manner each of the other brushes and its holder is withdrawn from operative position with the brush contiguous the commutator. With many machines there are four brushes so that four plates and hook members are needed to comprise a tool adapted to withdraw the brush and its holder from the commutator. When the brushes and holders have been withdrawn as are the two brushes shown in Fig. 1, it is easy to withdraw the commutator and armature out the other end of the casing from that in which the brushes are mounted, and it is especially easier to insert the commutator and armature with the brushes withdrawn since there is nothing to get in the way of the commutator, as the brushes and their holders would do if they were not retracted. Under the prior art it has been necessary to have one or more workmen assist in holding each pair of brushes withdrawn.

When the armature and commutator have been replaced, each of the brushes may be released and allowed to return to its operative position contiguous the commutator by disengaging the holding tooth from the recess 21. The plates and hook members may then be withdrawn and assembled on a support such as a key ring 24 or other convenient means of holding all of the parts constituting the tool of this invention.

The plate shown in Fig. 5 is the same as that shown in Figs. 3 and 4 except that the slot 22 has a portion normal thereto in order that the hook member 17 may if desired with specially shaped brush holders be arranged at right angles to the hook members shown in Fig. 1.

Fig. 6 shows a modified construction for the hook member in which the supporting tooth is held in engagement not by a recess 21 but by another portion 23 of the stem being resiliently connected with the toothed portion of the stem so as to normally hold or press the toothed portion again its contiguous end of the slot 25 in said plate member 15a. Instead of there being only one slot in the plate 15a there may also be the normally disposed slots similar to those indicated by the numeral 22 in Fig. 5.

It has been found that the embodiment found in Figs. 1 to 5 inclusive, is the preferred construction since the teeth seem to hold better when engaged in a recess 21 than when pressed by a spring against the edge of a slot, whereby there appears to be less danger of the embodiment shown in Fig. 2 slipping out of place than is the case with the embodiment shown in Figs. 6 and 7 for example.

Among the advantages of this invention may be enumerated the time saved with this invention in withdrawing and inserting the commutator and armature. Unlike the prior art one workman does all the necessary activity instead of there being two or more workmen as is generally necessary under the prior art having no temporary means for supporting the brush holders out of operative position. The tool of this invention may be conveniently carried by a workman in his pocket.

The slot in the supporting plate through which the hook member passes, is of such size and shape as to act as a guide for the flat sides of the hook member. Longitudinally of the slot, however, there is sufficient clearance to permit the hook member being rocked to engage and disengage the brush holder. The supporting plate members have been shown and described as being adapted to span transversely the casing aperture, in order that such plates may be as conveniently compact as possible. Such plate members might be made to span the casing aperture longitudinally, that is circumferentially, but in such case they will generally need to be longer and sometimes curved, so that this is not preferred. The depressed portion or recess 21, should preferably be separated from the edge of the slot 16 by a raised or undepresssed portion as shown to assist in keeping the tooth of the hook member from slipping off the plate.

I claim:

1. A mechanism for holding the brush of a dynamo electric machine retracted from the commutator which comprises a slotted plate adapted to span a hole in the machine casing radially outside the brush, a hook member adapted to pass through a slot in said plate and be guided by said plate yet with enough clearance to allow limited rocking movement of said hook member, a tooth on the stem of said hook member for supporting said member and brush held thereby, the outer surface of said plate adjacent its slot being provided with a depressed portion of a size and shape to receive said tooth and prevent its slipping off of said plate.

2. A retracting mechanism for the brush of a dynamo electric machine comprising a plate provided with a slot, a hook member adapted to pass through said plate slot, the stem of said hook member being provided with inclined teeth, a recess portion on said plate adjacent the edge of said slot for receiving therein a tooth on the stem of said hook.

3. A mechanism for holding the brush of a dynamo electric machine retracted from the commutator, which comprises a slotted plate adapted to span a hole in the machine casing radially outside the brush, a hook member adapted to pass through a slot in said plate, and be guided by said plate, yet with enough clearance to allow limited rocking movement of said hook member as it is moved through said plate to engage said brush, a tooth on the stem of said hook member, the outer surface of said plate adjacent its slot being provided with a portion shaped to prevent the tooth from slipping off the plate, and the brush supporting portion of said hook member extending at an acute angle to the stem of the hook member.

FRED KOENIG.